C. A. PERSONS.
SADDLE.
APPLICATION FILED MAY 18, 1912.

1,046,636.

Patented Dec. 10, 1912.

2 SHEETS—SHEET 1.

Witnesses.
R. D. Tolman.
H. M. Kennedy.

Inventor
Charles A. Persons.
By Hartley W. Bartlett
Attorney

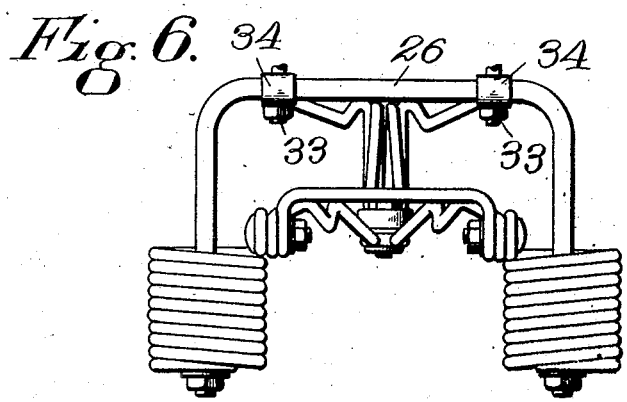

UNITED STATES PATENT OFFICE.

CHARLES A. PERSONS, OF WORCESTER, MASSACHUSETTS, ASSIGNOR TO STANDARD SPECIALTY COMPANY, OF WORCESTER, MASSACHUSETTS, A CORPORATION OF MASSACHUSETTS.

SADDLE.

1,046,636.  Specification of Letters Patent.  Patented Dec. 10, 1912.

Application filed May 18, 1912. Serial No. 698,108.

*To all whom it may concern:*

Be it known that I, CHARLES A. PERSONS, a citizen of the United States, residing at Worcester, in the county of Worcester, State of Massachusetts, have invented a certain new and useful Improvement in Saddles, of which the following is a specification, reference being had therein to the accompanying drawings.

This invention relates to resilient seats or saddles, but more particularly to such as are used on velocipedes, bicycles and the like.

For simplicity and clearness in the following description the device will be treated in connection with bicycle saddles only but it should be clearly understood that it may be applied to any seat or saddle.

The object of this invention is to provide a saddle having the highest degree of vibration absorption, resiliency and smoothness of action, and whose construction and arrangement of parts permits of easy adjustment.

One feature of the invention is the clamp connecting the peak support to the main support by means of which all distorting of the frame is obviated.

Another feature is the spring construction whereby the peak support runs beneath the seat to the cantle plate to take the place of the compression member of a compound spring, thereby securing the results without the additional parts.

A further feature is the device for securing the cantle of the seat, or the compression spring members, if they are used, to the extension spring members so that the frame may be adjusted to fit different sizes of seats.

Figure 1:
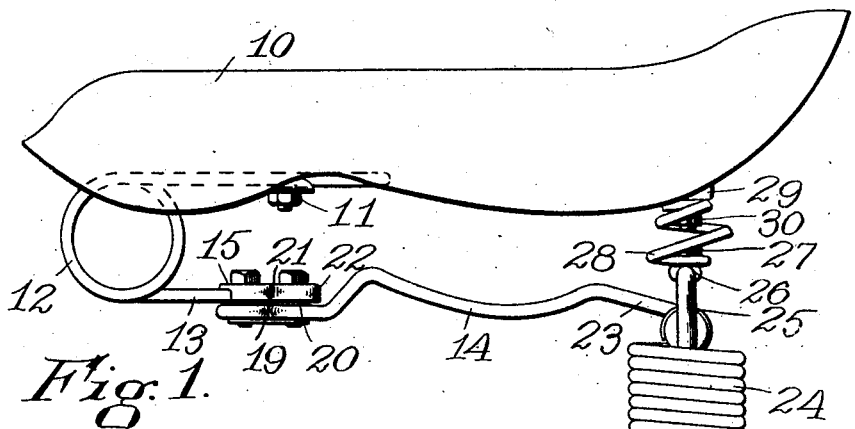
Figure 5:
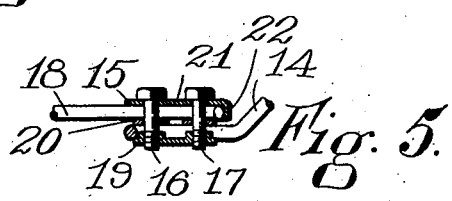
Figure 2:
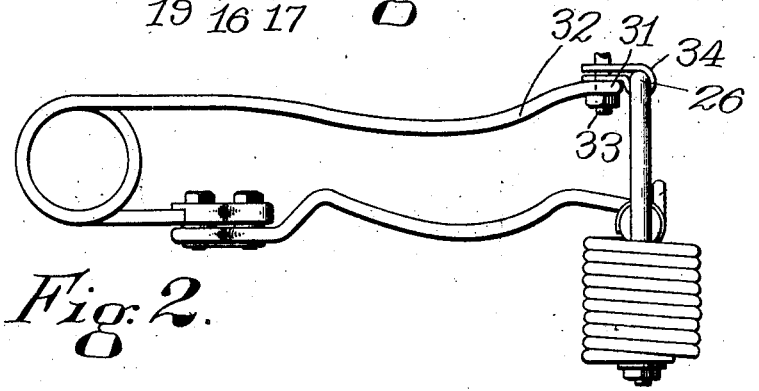
Figure 3:
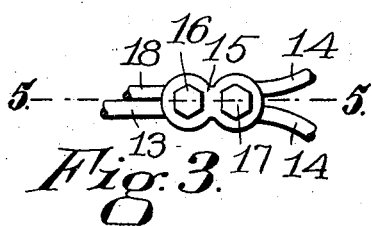
Figure 4:
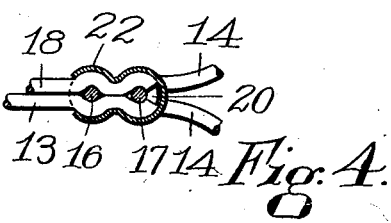

Referring to the drawings:—Figure 1 is a side elevation of one embodiment of the invention complete. Fig. 2, side elevation of a modified form of the seat support, as will be described more fully hereinafter. Fig. 3, detail view of the frame fastener, shown in Figs. 1 and 2, as will be described more fully hereinafter. Fig. 4, same as Fig. 3, portions of binding washer and bolts being removed to show side flanges, as will be described fully hereinafter. Fig. 5, section on line 5—5 of Fig. 3. Fig. 6, same as Fig. 2, rear elevation.

In Fig. 1 of the drawings is shown a saddle composed of a seat 10, the forward end of which is secured by means of the peak fastener 11 to the upper extremity of the peak support 12. The lower extremity 13 of the peak support 12 is secured to the main support 14 by means of a clamp 15. In describing the peak and main supports of the saddle, only the member on one side thereof will be described, as the other member is similar to it only reversed, and an explanation of one will apply equally to the other.

In Figs. 3, 4 and 5 are shown portions of both members and it will be seen that in this embodiment the peak support is constructed in two separate parts, whereas in the main support the two parts or members thereof are integral, but this construction is not essential and either or both may be integral or separate as desired.

Clamp 15 is shown to comprise two bolts or binders 16 and 17 about which the peak and main supports pass in the manner best shown in Fig. 4 of the drawings, the peak supporting member not shown in Figs. 1 and 2 being designated 18. Beneath the main support 14 is a washer 19 provided with preferably threaded orifices through which pass the bolts 16 and 17, and between the main and peak supports is a second washer 20 also provided with orifices to permit passage of the binders. Above the lower extremities of the peak support is a third washer 21 which is provided with a downwardly extending flange 22 cut away at one end to permit the exit of the peak supports, as is best shown in Fig. 4. The conformation of the supports and the washer flange 22 causes the former to be tightly bound around the bolts 16 and 17 and prevents any swinging of one support on the other, as is frequently the case where a single binder is used.

In the embodiments shown in the drawings, the main supports are constructed of wire which is preferably resilient, but it may readily be seen that a rigid truss or other suitable form of under framing may be used. To the rear extremities 23 of the main support are secured the upper extremities of the extension springs 24 which have their lower extremities secured to the lower end of up-right rods or posts 25 forming a portion of the cantle support which comprises these two posts 25 and the bridge 26 connecting their upper extremities.

In the modification shown in Fig. 1 the bridge is provided with vertical orifices through which pass the bolts 27 which secure the lower extremity of the compression springs 28 to the same. The upper extremity of these springs 28 are secured to the cantle plate 29 by means of the bolts 30.

In the modification shown in Fig. 2 the upper end of the peak support is divided instead of being continuous as was the case in the embodiment shown in Fig. 1, and the members thereof are lengthened to extend to a point adjacent to the cantle supporting bridge. Eyelets 31 are formed at the rear extremities 32 of these peak supporting members to receive bolts 33 which pass through the extremities of clips 34 adapted to fasten these extremities to the bridge and to bind this clip 34 upon the bridge to form a rigid connection between the bridge and the extremities of the peak support. It may readily be seen that these rearward extremities of the peak support might be secured directly to the bridge by means of bolts and orifices such as were illustrated to secure the lower extremities of the compression springs 28 thereto in the embodiment shown in Fig. 1. The clip construction permits these fasteners to be moved to points directly beneath the point of fastening to the cantle plate and thus allows the same bridge to be used with different widths of saddle. In this embodiment the rear extremities of the peak supports act as a compression spring support for the cantle and thus with the extension spring produces an action similar to the compound type of support composed of springs 24 and 28 in the form shown in Fig. 1. The short peak support of the embodiment in Fig. 1 may be used with the Fig. 2 embodiment and the clips 34 secured either to the lower extremities of the compression springs or directly to the cantle plate. The cantle support may be fastened directly to the cantle plate by bolts or screws passing through the bridge orifices of the embodiment shown in Fig. 1 or the orifices in the clips shown in Fig. 2.

The applicant has endeavored to illustrate and describe the most common forms of his invention, but he is aware that the construction and arrangement of parts can be easily further changed by anyone skilled in the art and he does not care to be limited to the particular forms herein shown and described.

What I claim as my invention and desire to secure by Letters Patent is:—

1. In a device of the class described, a seat, and a support therefor comprising, a main frame, extension springs suspended by their upper extremities from the rear portion of said main frame, upright rods having their lower extremities secured to the lower extremities of said extension springs and extending upwardly within the coils of said springs, and a resilient peak support having its lower portion secured to said main frame and its upper portion extending rearwardly beneath said seat into connection with said upright rods.

2. In a device of the class described, a seat; and a resilient support thereof having extension springs suspended by their upper extremities from the rear end of the lower portion thereof, upright rods secured to the lower extremities of said extension springs and extending upwardly within the coils of said springs, and a rigid member connecting said rods, the upper portion of said support extending rearwardly beneath said seat and having its extremity secured to said rigid member.

3. In a device of the class described, a seat; a resilient support therefor comprising an upper and a lower portion connected by a loop at their forward extremities, extension springs suspended by their upper extremity from the rear of said lower portion, upright posts having their lower extremities fastened to the lower extremities of said extension springs and extending upwardly within the coils of the same, a rigid brace connecting posts, the upper portion of said support extending rearwardly beneath said support and having its rearward extremities secured to said brace, means for securing the peak of said seat to the upper portion of said support, and means for securing the cantle portion of the seat to said bridge.

4. In a device of the class described, a main support and a peak support each composed of two members; and means for fastening together said support comprising, a washer, a plurality of orifices arranged in a row in said washer, bolts passing through said orifices and between the members of each of said supports, and a second washer having orifices therethrough corresponding to the orifices in the first washer to receive said bolts, and adapted to bind said members against said first washer.

5. In a device of the class described, a main support and a peak support each composed of two members; and means for fastening together said supports comprising, a washer, a plurality of orifices arranged in a row in said washer, bolts passing through said orifices and between the members of each support, a second washer having orifices therethrough corresponding to the orifices in the first washer to receive said bolts and provided with flanges adapted to bind the members of the supports against the said bolts.

6. In a device of the class described, a main support and a peak support each composed of two members; and means for fastening together said supports comprising, a washer, a plurality of orifices arranged in a row in said washer, bolts passing through said orifices and between the members of said supports, the portions of the support members adjacent to said bolts being formed to follow the contour thereof; a second washer between said supports provided with orifices corresponding to the orifices in the first washer to receive said bolts, and a third washer also provided with orifices to receive said bolts and adapted to act in opposition to said first washer to bind said supports together.

7. In a device of the class described, a seat; a main supporting frame therefor comprising two members having their rear extremities separated, a cantle supporting bridge connecting said extremities; and clips adapted to grasp said bridge to secure the same to the cantle portion of the seat.

8. In a device of the class described, a seat; a main supporting frame therefor comprising two members having their rear extremities separated, a cantle supporting bridge connecting said extremities; clips adapted to grasp said bridge; and means for connecting said clips with the cantle portion of said seat.

In testimony whereof I affix my signature, in the presence of two witnesses.

CHARLES A. PERSONS.

Witnesses:
HARTLEY W. BARTLETT,
HANNAH M. KENNEDY.